US010607627B2

(12) United States Patent
Rosenkiewicz (10) Patent No.: US 10,607,627 B2
(45) Date of Patent: *Mar. 31, 2020

(54) ACTIVE ACOUSTIC ECHO CANCELLATION FOR ULTRA-HIGH DYNAMIC RANGE (71) Applicant: Intel Corporation, Santa Clara, CA (US)

(72) Inventor: Sebastian Rosenkiewicz, Gdansk (PL)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/450,738

(22) Filed: Jun. 24, 2019

(65) Prior Publication Data
US 2019/0311729 A1 Oct. 10, 2019

Related U.S. Application Data (63) Continuation of application No. 15/923,886, filed on Mar. 16, 2018, now Pat. No. 10,366,704.

(51) Int. Cl.
G10L 21/0232 (2013.01)
H04R 3/04 (2006.01)
H04M 9/08 (2006.01)
H04R 3/00 (2006.01)
G10K 11/178 (2006.01)
G10L 21/0208 (2013.01)

(52) U.S. Cl.
CPC ........ G10L 21/0232 (2013.01); G10K 11/178 (2013.01); H04M 9/082 (2013.01); H04R 3/00 (2013.01); H04R 3/04 (2013.01); G10L 2021/02082 (2013.01); H04R 2430/03 (2013.01)

(58) Field of Classification Search
CPC .......... H04M 9/082; H04M 9/02; H04M 9/08; H04M 3/002; H04B 3/23; H04B 3/20; H04R 3/02; H04R 3/005; H04R 3/04; G10K 11/178; G10K 11/175; G10K 2210/505; G10L 19/03; G10L 21/0232; G10L 21/02
USPC ............. 381/66, 71.1, 73.1, 94.1, 94.2, 94.3
See application file for complete search history.

(56) References Cited

U.S. PATENT DOCUMENTS 4,670,903 A * 6/1987 Araseki ................... H04B 3/23
379/406.08
4,970,903 A 11/1990 Hanson
6,694,018 B1 2/2004 Omori
(Continued)

OTHER PUBLICATIONS

Notice of Allowance for U.S. Appl. No. 15/923,886, dated Mar. 27, 2019.
(Continued)

Primary Examiner — Ahmad F. Matar
Assistant Examiner — Sabrina Diaz
(74) Attorney, Agent, or Firm — Green, Howard, & Mughal LLP.

(57) ABSTRACT

Techniques related to active acoustic echo cancellation are discussed. Such techniques may include generating an audio output signal having a portion thereof corresponding to a first audio frequency range to negate a response of an audio input device to an output from a speaker in a second audio frequency range at a response negation rate and decimating an audio input signal based on the response negation rate to generate a resultant audio input signal.

20 Claims, 6 Drawing Sheets (56) References Cited

U.S. PATENT DOCUMENTS

| | | | | |
|---|---|---|---|---|
| 9,020,158 B2* | 4/2015 | Wertz | ............... | G10K 11/178 |
| | | | | 381/71.11 |
| 2007/0206778 A1* | 9/2007 | Matsui | ............... | H04M 9/082 |
| | | | | 379/406.01 |
| 2010/0215190 A1* | 8/2010 | Itou | ............... | G10K 11/178 |
| | | | | 381/94.2 |
| 2012/0308022 A1* | 12/2012 | Ookuri | ............... | G10K 11/178 |
| | | | | 381/71.1 |
| 2018/0343514 A1 | 11/2018 | Dusan et al. | | |

OTHER PUBLICATIONS

Office Action for U.S. Appl. No. 15/923,886, notified on Oct. 5, 2018.

* cited by examiner

ACTIVE ACOUSTIC ECHO CANCELLATION FOR ULTRA-HIGH DYNAMIC RANGE

CLAIM OF PRIORITY

This Application is a Continuation of, and claims priority to, U.S. application Ser. No. 15/923,886, filed on Mar. 16, 2018, now U.S. Pat. No. 10,366,704, and titled "ACTIVE ACOUSTIC ECHO CANCELLATION FOR ULTRA-HIGH DYNAMIC RANGE", which is incorporated by reference in its entirety for all purposes.

BACKGROUND

In instances where a microphone and a speaker are implemented in the same environment, it is often desirable to reduce or eliminate undesirable echo generated by the microphone due to sound emanating from the speaker. Furthermore, in some implementations, it is desirable to record at the microphone even while the speaker is outputting unrelated content. For example, it may be desirable to, while the speaker is playing music, far-end speech or other content, for the microphone to attain input audio data that may be further processed by speech recognition engines or other applications. However, attaining useful input audio data in such contexts may be difficult due to the microphone picking up the sound (i.e., echo) from the speaker.

In typical acoustic echo cancellation use cases, the usable dynamic range of an audio input device (e.g., microphone) is limited due to echo sound level reaching the audio input device. For example, in implementing loud echo reduction on a 16-bit audio stream, total microphone gain may need to be reduced to avoid overload and clipping. Such reduction in microphone gain often renders the residual audio signal unusable for speech processing or similar applications due to the decrease of effective bit-depth. In such contexts, classic acoustic echo cancellation may post-process audio input data received at the microphone to remove the undesirable echo. Such techniques improve signal-to-noise ratio (SNR), however they are unable to recover speech information lost due to reduced microphone gain. These problems arise for cases where total input signal dynamic range is larger than the range of the microphone and/or processing pipeline bit-depth capacity. For example, quiet speech signals are lost under loud echo signal conditions or occupy less effective bits. Such problems may lead to worse SNR compared to no echo condition even with a theoretically ideal acoustic echo cancellation.

It may be advantageous to improve input audio data received at an audio input device of a device in contexts when an echo, particularly from a speaker of the same device, is present. It is with respect to these and other considerations that the present improvements have been needed. Such improvements may become critical as the desire to implement devices capable of playing content through a speaker while recording speech becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 3 illustrates an example spectrogram of an example audio output signal after filter response convergence;

DETAILED DESCRIPTION

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, apparatuses, computing platforms, and articles are described herein related to active acoustic echo cancellation and, in particular, to providing echo cancelling frequency waves in an above human hearing frequency range to actively cancel or negate responses within a lower frequency range at a microphone.

As discussed, it may be desirable to improve input audio data received at an audio input device of a device in contexts when an echo, particularly from a speaker of the same device, is present. In some embodiments, echo cancelling frequency waves above the human hearing range (or largely above the human hearing range, with some overlap) are emitted from a device speaker in parallel with an echo signal. The output signal from the device speaker is unaffected for users of the device (e.g., from human ear perspective). However, the output signal from the device speaker is actively cancelled or negated at the microphone membrane level at a response negation rate such as every second sample. Such techniques offer the advantage of being implementable without a second speaker (as is common in active noise cancellation). Instead, the techniques discussed herein may be implemented without additional hardware (e.g., in software only or with optional dedicated processing). Furthermore, the discussed techniques offer ultra-high input dynamic range capability during loud echo playback using the same hardware (e.g., microphone) and without any additional cost. Such techniques allow for the extraction of quiet speech under echo conditions that would otherwise overdrive the input device (e.g., the audio input stage of the device).

Figure 1:
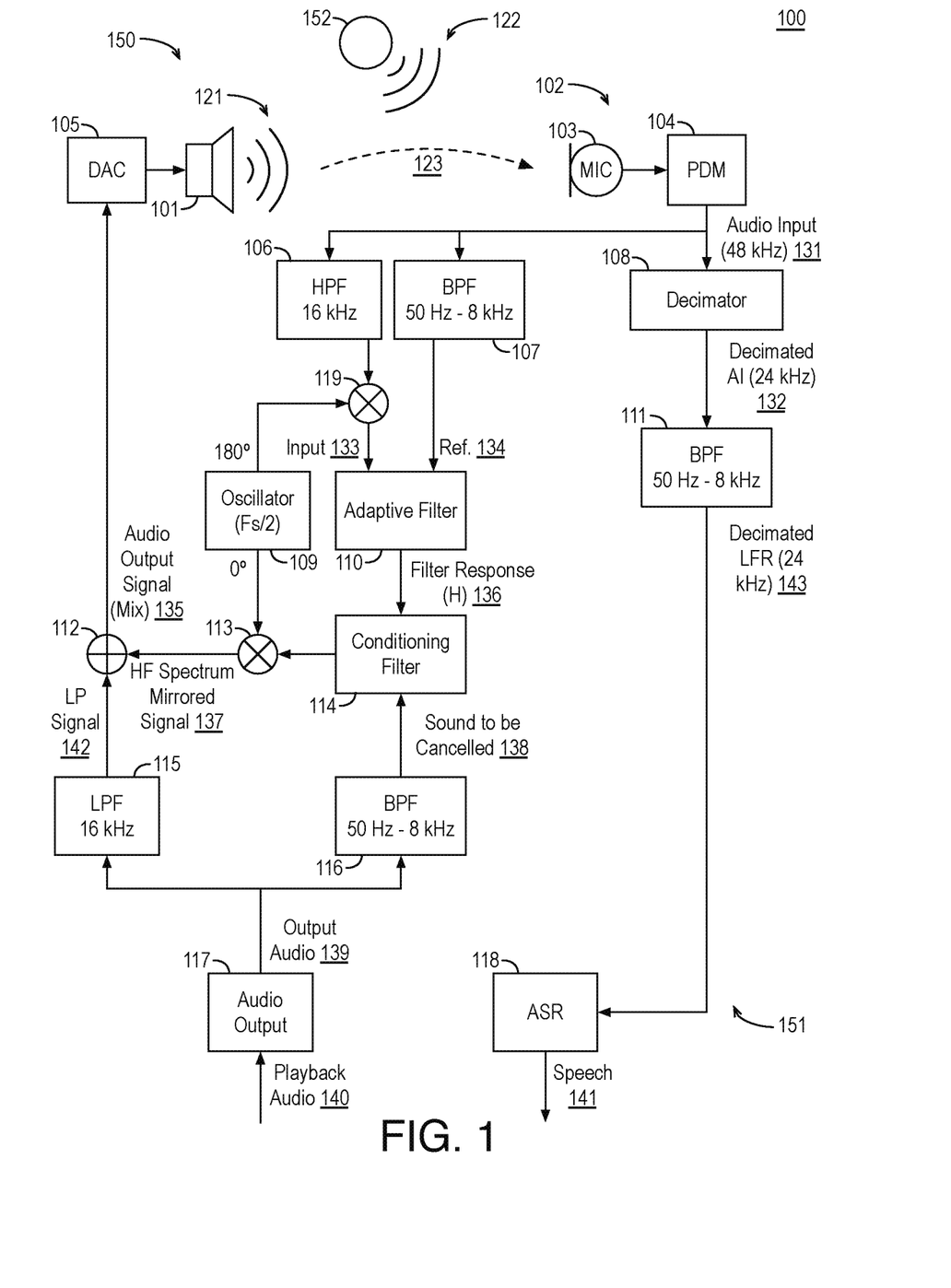
FIG. 1 is an illustrative diagram of an example environment including a user interacting with an example device.

FIG. 1 is an illustrative diagram of an example environment 100 including a user 152 interacting with an example device 150, arranged in accordance with at least some implementations of the present disclosure. As shown in FIG. 1, a speaker 101 of device 150 is emitting an audio output 121 while user 152 speaks to provide an utterance 122. For example, user 152 may be listening to playback audio 140 (e.g., as provided by an audio file, streaming audio, etc.) such as music or other content provided by speaker 101 of device 150 and, without stopping the playback of the content, user 152 may desire to provide a command to device 150 such that utterance 122 may be translated into speech signal 141, which may be used by device 150 to perform an action. Device 101 may be implemented via any suitable device(s) or system(s) capable of performing the operations discussed herein. For example, device 101 may be implemented via a personal computer, a laptop computer, a tablet, a phablet, a smart phone, a digital camera, a gaming console, a stand-alone smart speaker, an all-in-one device, a two-in-one device, or a platform such as a mobile platform or the like. For example, as used herein, a system, device, computer, or computing device may include any such device or platform.

As shown, speaker 101 is coupled via an acoustic echo channel 123 having a particular impulse response, as is further discussed below, to an audio input device 102. In an embodiment, as shown, audio input device 102 includes a microphone 103 and a pulse density modulator (PDM) 104. However, audio input device 102 may include any suitable device that receives audio input and provides an audio input signal 131. As used herein, the terms audio input and audio output refer to physical audio or sound that may be received (via microphone 103) or generated (via speaker 101). The terms audio input signal and audio output signal refer to signals (e.g., digital or analog signals) that are representative of physical audio or sound. In an embodiment, audio input device 102 includes microphone 103 and PDM 104 as an integrated device, which may be characterized simply as a microphone. Speaker 101 is coupled to a digital to analog converter (DAC) 105, which receives an audio output signal 135 and translates the digital signal to an analog signal to drive speaker 101 to generate audio output 121 corresponding to audio output signal 135. In an embodiment, device 150 implements a conventional audio speaker 101 and microphone 103 coupled to a conventional audio DAC 105 and PDM 104, respectively, whose audio specifications, particularly sampling rate and frequency response, fulfill requirements of the remaining system components, as described below. Furthermore, DAC 105, speaker 101, PDM 104, and microphone 103 may be implemented in hardware while the remaining modules or components of device 150 may be implemented as an audio controller 151. Audio controller 151 may be implemented in software, firmware, hardware, or any combination thereof.

As discussed, audio output signal 135 is used to drive speaker 101 to generate audio output 121. Audio output signal 135 is generated by adding (via adder 112, which may also be characterized as a mixer) high frequency spectrum mirrored signal 137 and a low frequency signal from output audio signal 139. For example, playback audio 140 (e.g., an audio file, streaming audio, etc. that is desired to be played) may be optionally converted, by audio output component 117, to output audio signal 139, which includes an audio signal for playback. Output audio signal 139 is provided to a low pass filter (LPF) 115, which passes signals with a frequency lower than a cutoff frequency (in the illustrated example 16 kHz) while attenuating or eliminating signals with a frequency higher than the cutoff frequency to generate low frequency signal 142, which may be characterized as sound for playback or the like. Output audio signal 139 is also provided to a band pass filter (BPF) 116, which passes signals with a frequency between cutoff frequencies (in the illustrated example 50 Hz to 8 kHz) while attenuating or eliminating signals with a frequency outside the cutoff frequencies. In an embodiment, BPF 116 may be a LPF that passes signals with a frequency lower than a cutoff frequencies such as 8 kHz.

The resultant signal from BPF 116 is sound to be cancelled signal 138 and corresponds to the bands passed by BPF 111 and BPF 107 as discussed further herein. That is, it is desirable to cancel or negate, at audio input device 102 alternating samples of the audio of output audio signal 139 within the frequency band to be used, in this example, for speech recognition. For example, without the presence of utterance 122, through the addition of high frequency spectrum mirrored signal 137 as generated based on sound to be cancelled signal 138, every other sample of audio input signal 131 would (under idealized circumstances) be zero. It is noted that such cancellation occurs only at audio input device 102 (e.g., at a receiving membrane of microphone 103) within environment 100.

In the presence of utterance 122, every other sample thereby includes (again under idealized circumstances) only the audio data corresponding to utterance 122. By decimating audio input signal 131 to attain such every other sample, decimated audio input signal 132 is provided. Decimated audio input signal 132 (which now includes, ideally, information only from utterance 122) is then band pass filtered to the frequency range of, in the illustrated example, 50 Hz to 8 kHz by BPF 111 to generate a decimated low frequency range (LFR) signal 143, which is provided to automatic speech recognition (ASR) module 118. Although illustrated with respect to ASR module 118 and, more generally, extracting speech audio data, decimated audio input signal 132 may include any suitable frequency range and may be representative of any suitable audio characteristic(s). Although discussed with respect to every other sample of audio input signal 131 being negated by the addition of high frequency spectrum mirrored signal 137 as generated based on sound to be cancelled signal 138 (i.e., a negation rate of 1:2 or 1/2), any even negation rate may be used such as negating one of every four samples, etc. so long as a suitable sample rate is attained for ASR or the like.

Thereby, device 150 provides decimated low frequency range (LFR) signal 143 that is representative of utterance 122 without representing audio output 121. For example, user 152 may listen to audio output 121 (e.g., a song) while providing an audio command via utterance 122. The command may be recognized by ASR module 118 and provided as speech signal 141, which may be any suitable data structure representative of speech such as a string of words or phonetic units or the like. Other components of device 150 (not shown) may, in response to speech signal 141, perform a task such as opening an application, retrieving data, saving data to memory, or the like.

As discussed, high frequency spectrum mirrored signal 137 (e.g., a sound that is above human hearing range) is mixed with low frequency signal 142. When implemented as part of audio output 121, high frequency spectrum mirrored signal 137 mutually cancels out or negates every second sample (e.g., at a negation rate) audio received at audio input device 102 (e.g., a microphone membrane of microphone 103). The corresponding audio input signal 131 at a first sampling rate such as 48 kHz in the illustrated example is decimated based on the discussed negation rate. As used herein, the term negation rate is used to indicate the rate at which samples are cancelled out or negated at audio input device 102 such as every second (i.e., every other) sample being cancelled out or negated, every fourth sample, etc. The decimation by decimator 108 of audio input signal 131 at a first sampling rate provides a decimated audio input signal 132 at a lower sampling rate such as 24 kHz in the illustrated example. As discussed, decimated audio input signal 132 includes a signal corresponding to utterance 122 and decimated audio input signal 132 may be characterized as a resultant audio input signal, an echo cancelled audio signal, echo cancelled audio data, etc.

High frequency spectrum mirrored signal 137 may be generated using any suitable technique or techniques. In an embodiment, sound to be cancelled signal 138 (i.e., an output audio signal having a particular audio frequency range) is filtered by a conditioning filter 114 based on a filter response (H) 136 that is tuned based on speaker 101, audio input device 102, and acoustic echo channel 123. That is, speaker 101 and audio input device 102 have particular acoustic qualities, orientations, and a distance therebetween. Furthermore, speaker 101 and audio input device 102 are within environment 100 that has particular acoustic qualities that influence speaker 101 and audio input device 102. Such characteristics provide a unique acoustic echo channel 123, having a particular impulse response ($H^{-1}$), between speaker 101 and audio input device 102.

As shown, audio input signal 131 is provided to high pass filter (HPF) 106, which passes signals with a frequency higher than a cutoff frequency (in the illustrated example 16 kHz) while attenuating or eliminating signals with a frequency lower than the cutoff frequency. Audio input signal 131 is also provided to a band pass filter (BPF) 107, which passes signals with a frequency between cutoff frequencies (in the illustrated example 50 Hz to 8 kHz) while attenuating or eliminating signals with a frequency outside the cutoff frequencies. In an embodiment, BPF 107 may be a LPF that passes signals with a frequency lower than a cutoff frequencies such as 8 kHz. As shown, the signal passed by band pass filter 107 is provided to an adaptive filter 110 as a reference signal 134. Furthermore, the high frequency signal from HPF 106 is processed by multiplying, via multiplier 119, with a signal from oscillator 109 at Fs/2 frequency, 180 degrees phase shifted (where Fs is the sampling rate of PDM 104), to bring the high frequency signal down to the frequency range of sound to be cancelled signal 138 and reference signal 134 (i.e., reversing the spectrum mirroring effect) to generate input signal 133 having a frequency range, in this example, of 0 to 8 kHz. For example, multiplying the high frequency signal with a sine wave of Fs/2 at 180° frequency automatically converts the 16 to 24 kHz signal down to 0 to 8 kHz by unmirroring the spectrum.

Adaptive filter 110 receives input signal 133 and reference signal 134 and adaptive filter 110 generates filter response (H) 136. Filter response (H) 136 may include any suitable filter coefficients for implementation by a filter model or conditioning filter to model an inverse of acoustic echo channel 123. For example, as the coefficients of filter response (H) 136 are determined by adaptive filter 110, acoustic echo cancellation may be achieved with respect to acoustic echo channel 123 by applying the filter response (H) 136, which resembles the inverse of the acoustic echo channel 123. Adaptive filter 110 may apply any suitable adaptive algorithm to generate filter response (H) 136 such as a least mean squares (LMS) algorithm that estimates a filter response (H) 136 by generating filter coefficients that relate to producing the least mean squares of the error between input signal 133 and reference signal or variants of the LMS algorithm. In addition or in the alternative, adaptive filter 110 may be aided by trying to reduce an error signal between the output from BPF 111 and input signal 133.

As discussed, sound to be cancelled signal 138 (i.e., an output audio signal having a particular audio frequency range) is filtered by a conditioning filter 114 based on filter response (H) 136. Filter response (H) 136 is tuned based on speaker 101, audio input device 102, and environment 100, and resembles an inverse of the acoustic echo channel 123. Conditioning filter 114 filters sound to be cancelled signal 138 by applying the filter response (H) 136 and the resultant signal (e.g., having an audio frequency range of 50 Hz to 8 kHz) is processed by multiplying, via multiplier 113, with a signal from oscillator 109 at Fs/2 frequency to bring the frequency range of sound to be cancelled signal 138 up to an audio frequency that may be merged with the output of LPF 115 to generate high frequency spectrum mirrored signal 137. For example, oscillator 109 generates high frequency spectrum mirrored signal 137 by coding the output signal from conditioning filter 114 as a mirrored signal. In an embodiment, high frequency spectrum mirrored signal 137 has an audio frequency range of about 16 kHz to 24 kHz. For example, multiplying the high frequency signal with a sine wave of Fs/2 at 0° frequency automatically converts the 50 Hz to 8 kHz signal up to 16 to 24 kHz.

High frequency spectrum mirrored signal 137 is mixed with the output from LPF 115, low frequency signal 142, by adder 112 to generate audio output signal 135. Audio output signal 135 is used to drive speaker 101 to generate audio output 121 as discussed. The described techniques utilize echo cancelling audio waves above human hearing range (or largely above human hearing range) emitted from speaker 101 (as provided by high frequency spectrum mirrored signal 137) in parallel with the audio waves of the sound to be canceled, which are within the human hearing range. In an embodiment, the echo cancelling frequency waves have a frequency range of 16 kHz to 24 kHz and the sound to be canceled frequency waves have a frequency range of 0 or 50 Hz to 8 kHz. The output audio is unaffected from the human ear perspective of user 152, but is actively cancelled at microphone 103 (e.g., a microphone membrane level every $2^{nd}$ sample).

The techniques discussed herein may use a typical audio speaker 101 and one or more microphone 103 coupled to a typical audio DAC 105 and PDM controller 104, respectively. A sound (e.g., as provided by high frequency spectrum mirrored signal 137) that is above human hearing range is mixed with human hearing range sound (e.g., as provided by low frequency signal 142) to generate audio output 121, such that the sound above human hearing range mutually cancels out on every second sample upon reaching the microphone membrane of microphone 103. The received audio input signal 131 is decimated by two to extract echo-cancelled audio data. In some embodiments, filtering may be applied to reduce aliasing artifacts. It is noted that ambient noise at high frequency range is typically much lower than at baseband frequencies such that artifacts from environment 100 are negligible.

The high frequency echo cancelling sound of audio output 121 may occupy an uppermost band of the audio spectrum and its bandwidth may be equal to that of the signal to be cancelled (e.g., sound to be cancelled signal 138). In the illustrated example, which is provided for exemplary speech processing (e.g., in the 0 to 8 kHz frequency range) and a sampling rate of 48 kHz for audio input signal 131, the cancelling sound may occupy the 16 to 24 kHz range. In such examples, the output sound bandwidth for output audio 139 (e.g., low frequency signal 142) is reduced from a range of 0 to 24 kHz to a range of 0 to 16 kHz. However, since the sampling rate remains the same and typical playback audio such as music does not contain significant components in the 16 to 24 kHz range, the perception of the playback audio by user is mostly unaffected.

As discussed, sound to be cancelled signal 138 is filtered using a runtime measured inverse of frequency response (e.g., filter response (H) 136) of the pairing of speaker 101 and microphone 103 (or audio input device 102), encoded as a spectrum-mirrored signal (e.g., high frequency spectrum mirrored signal 137) and mixed with output audio (e.g., low frequency signal 142). In some embodiments, filter response (H) 136 is modified or tuned over time and, at a start point of audio processing, filter response (H) 136 may not yet be tuned and may have, for example, all coefficients set to one. For example, assuming an initial frequency response, filter response (H) 136, of all ones, output audio signal 135 has the property that every second sample is zero. After filter response (H) 136 has fully converged, this property is moved away to the microphone membrane position via the application of filter response (H) 136, which is tuned to the inverse of acoustic echo channel 123. That is, when the portion of audio output 121 representative of high frequency spectrum mirrored signal 137 after tuning travels via acoustic echo channel 123 to a microphone membrane of microphone 103, the portion is modified by acoustic echo channel 123 (e.g., a forward filter of the speaker 101/microphone 103 system), effectively inverting the previous signal conditioning. Thereby, every second sample of audio input signal 131 includes only residual sound such as utterance 122 while negating the sound from audio output 121. For example, the performance of the discussed active acoustic echo cancellation (AAEC) is similar to that of a passive acoustic echo cancellation (AEC) (assuming high frequency response of the speaker-mic system is not significantly degraded), but, additionally, the dynamic range increases by the cancelled amount. For example, if passive AEC is capable of reducing echo by 30 dB at the band of interest, the same will happen for AAEC, but at microphone membrane level, which would add 30 dB more capacity to the input stage As illustrated, the discussed techniques may be used for a single microphone 103. For microphone arrays, when an overdrive condition is detected, one or two of the microphones (e.g., center microphones) may be selected for AAEC to detect quiet speech while the operation of other microphones in the array may be unaffected and they may operate with AEC (with reduced microphone gain due to overdrive), however the other microphones may also benefit from active cancellation when decimated, depending on microphone array layout.

Figure 2:
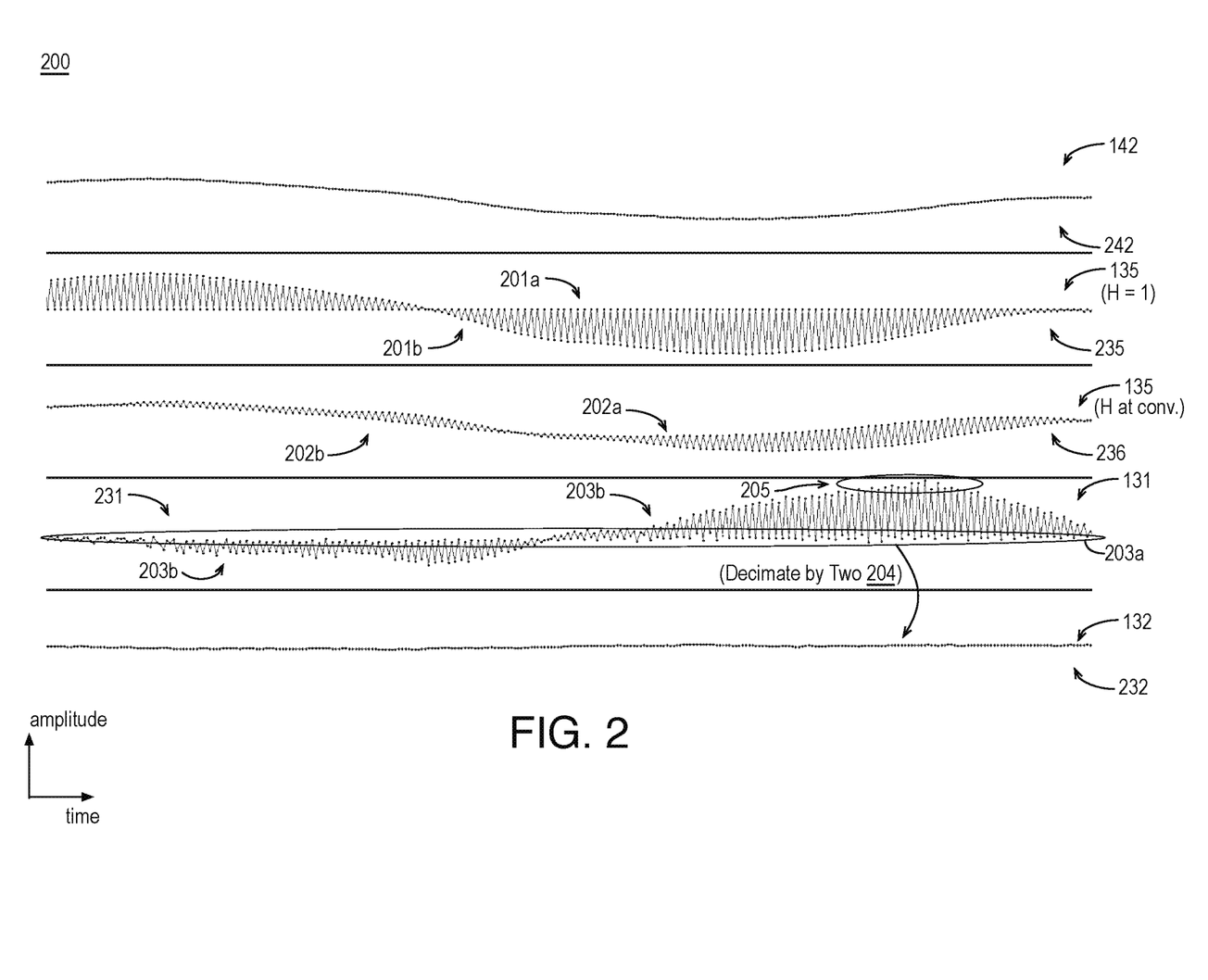
FIG. 2 illustrates example waveforms for various signals of device in operation.

FIG. 2 illustrates example waveforms 200 for various signals of device 150 in operation, arranged in accordance with at least some implementations of the present disclosure. In FIG. 2, waveforms (e.g., signal amplitude over time) are shown for example signals of low frequency signal 142, which may be characterized as sound for playback or the like, as illustrated with respect to waveform 242, audio output signal 135 with filter response (H) 136 at all ones (e.g., at initialization, H=1) as illustrated with respect to waveform 235, audio output signal 135 with a converged filter response (H) 136 (e.g., H at conv.) as illustrated with respect to waveform 236, audio input signal 131 as illustrated with respect to waveform 232, and decimated audio input signal 132 as illustrated with respect to waveform 232.

As discussed, low frequency signal 142 as illustrated with respect to waveform 242 includes a portion of output audio 139, which is representative of playback audio 140. As shown, low frequency signal 142 includes a source signal such as music or other audio for playback.

Audio output signal 135 with filter response (H) 136 at all ones (e.g., at initialization, H=1) as illustrated with respect to waveform 235 illustrates a waveform having samples 201 such that every other sample is zero (as illustrated with respect to samples 201a) while the alternating samples are representative of waveform 242 (e.g., for audio playback). As discussed, when filter response (H) 136 converges based on acoustic echo channel 123, the effect of samples 201 being zero in waveform 235 is translated to microphone 103 position. After convergence, audio output signal 135 with a converged filter response (H) 136 (e.g., H at conv.) as illustrated with respect to waveform 236 is generated such that every other sample will, under ideal circumstances and in the absence of utterance 122 or background noise, be zero at microphone 103 (as illustrated with respect to samples 202*a*) while the alternating samples are representative of waveform 242 (after the application of filter response (H) 136, as illustrated with respect to samples 202*b*).

The resultant recorded signal, audio input signal 131 is illustrated with respect to waveform 231. As show, waveform 231 includes samples 203 such that every other sample 203*a* is nearly zero and represents utterance 122 (and any background or residual noise) while alternating samples 203*b* are representative of both of utterance 122 (and any background or residual noise) and low frequency signal 142 such that samples 203*b* are not negated or canceled out by samples 202*a* of waveform 236. In the illustration of waveform 231, samples 203*a* are generally illustrated within a boundary that is close to zero while samples 203*b* are generally outside of the boundary.

As shown, a decimate by two operation 204 is performed on waveform 231 (as discussed with respect to decimator 108) to provide decimated audio input signal 132 as illustrated with respect to waveform 232. For example, waveform 232 may include half as many samples as waveform 231 and waveform 242. As shown, the resultant waveform 232 includes a signal only representative of utterance 122 (and any background or residual noise). As shown with respect to samples 205 of waveform 231 (e.g., samples 205 being a portion of samples 203*b*), clipping due to high volume does not affect waveform 232, which is a key feature of the disclosed techniques.

For example, the techniques discussed herein utilize the transmitting endpoint (e.g., speaker 101) for echo cancellation. The advantage of doing so is that the signal that reaches microphone (e.g., as represented by audio input signal 131) already has the echo component cancelled, which means that the input stage (e.g., PDM 104) can, after adaptie filter 110 convergence, process the data with reduced dynamics (e.g., 16 bits instead of 24 bits) while maintaining high dynamic range results.

For example, a spectrogram of an example audio output signal 135 after filter response convergence includes time on an x-axis, frequency on a y-axis, and shading to illustrate amplitude. In audio output signal 135, lower frequency range components (e.g., 0 Hz to 16 kHz in the spectrogram) are hearable music or other audio as provided by low frequency signal 142. Higher frequency range components (e.g., 16 kHz to 24 kHz in the spectrogram) are used to shift the air pressure at microphone 103 to cancel out lower frequency range components after corresponding audio input signal 131 is decimated to generate decimated audio input signal 132.

Figure 3:
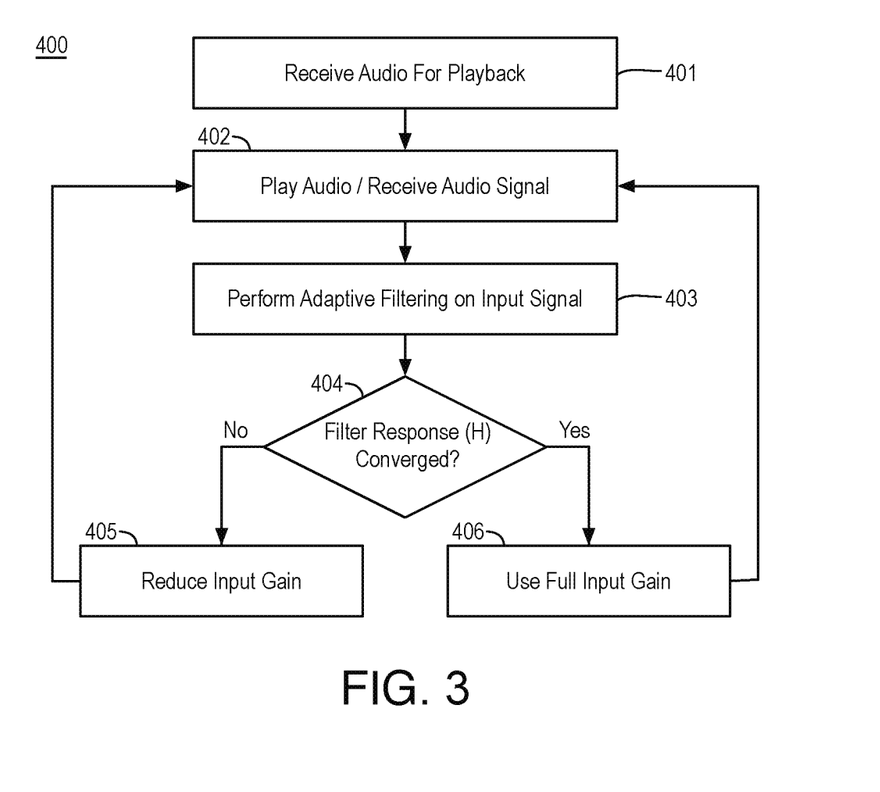
FIG. 3 is a flow diagram illustrating an example process for applying active audio acoustic echo cancellation.

With reference to FIG. 1, as discussed, a main speaker (e.g., speaker 101) is used to transmit cancelling sound (e.g., as provided by high frequency spectrum mirrored signal 137). For example, properties of a signal prepared as illustrated in FIG. 3 are exploited to provide the cancelling sound. Higher frequency range components 303 (i.e., a high frequency part) is a frequency-mirrored version of the transmitted echo (as included in lower frequency range components 302). Since both signals are synchronized and mixed together, higher frequency range components 303 (i.e., the high frequency part) pulls and pushes the air pressure every second sample. The hearing of (or ability to digitally separate) and reconstruct both parts by user 152 is unaffected and the property affects effective air pressure at microphone 103 only. After decimation by 2 of audio input signal 131, only the samples with air pressure oscillating close to zero are selected to generate decimated audio input signal 132, which includes only utterance 122 (and any background or residual noise) as illustrated with respect to FIG. 2.

FIG. 3 is a flow diagram illustrating an example process 400 for applying active audio acoustic echo cancellation, arranged in accordance with at least some implementations of the present disclosure. As shown, process 400 may include operations 401-406. Process 400 may be performed by a system or device (e.g., device 150) to improve audio functionality though active audio acoustic echo cancellation.

Process 400 begins at operation 401, where audio is received for playback. The audio input may be any suitable audio file, streaming audio, etc. For example, playback audio 140 or any other audio may be received for playback. Processing continues at operation 402, where the audio is played to provide physical audio output via a speaker and physical audio input is received via a microphone to generate an audio input signal. Audio playback may include any suitable technique or techniques such as generating an audio output signal such as audio output signal 135 from the audio and providing the digital audio output signal to a digital-to-analog converter and subsequent speaker. The physical audio may be received via microphone and sampled to generate an audio input signal.

Processing continues at operation 403, where adaptive filtering is performed on a received input audio signal to generate a filter response (H) based on the physical and audio characteristics of the speaker, microphone, and environment as discussed with respect to acoustic echo channel 123 herein. The adaptive filtering may be performed using any suitable technique or techniques. For example, an error between a high frequency signal (used as an input signal) and a low frequency signal (used as a reference signal) may be minimized to generate the filter response (H). Processing continues at decision operation 404, where a determination may be made as to whether the filter response (H) has converged. The determination as to whether the filter response (H) has converged may be made using any suitable technique or techniques. In an embodiment, the signal error may be compared to a threshold to determine convergence.

As shown, if the filter response (H) has not converged (such as early in audio playback), processing continues at operation 405, where an input gain of the audio input device (e.g., microphone) may be reduced to avoid difficulties due to clipping (e.g., overdrive). The input gain for the audio input device may be reduced using any suitable technique or techniques. For example, a clipping (overdrive) condition may cause most of the sound information in the audio input signal to be lost when filter response (H) is not known. By reducing or lowering the input gain, the audio input signal may be used to bring the adaptive filter to convergence as shown with respect to iterations through operations 402-405. It is noted that operation 405 may only need to be performed at one iteration (or a few iterations) and may be bypassed at other iterations. If the filter response (H) has converged, as shown at operation 406, the input gain for the audio input device may be returned or set to full gain or a higher gain.

Figure 4:
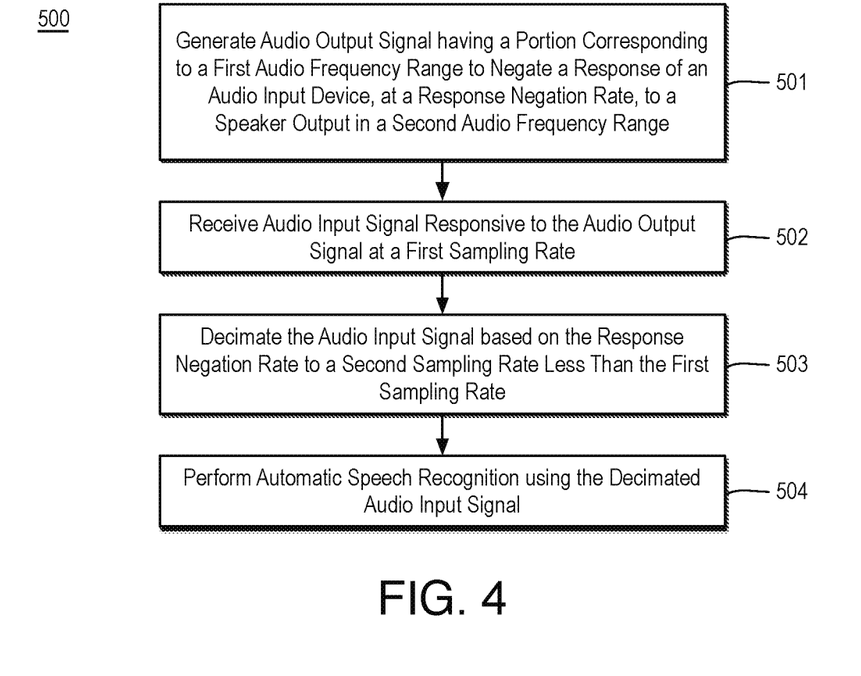
FIG. 4 is a flow diagram illustrating an example process for applying active acoustic echo cancellation.

FIG. 4 is a flow diagram illustrating an example process 500 for applying active acoustic echo cancellation, arranged in accordance with at least some implementations of the present disclosure. Process 500 may include one or more operations 501-504 as illustrated in FIG. 4. Process 500 may form at least part of an active acoustic echo cancellation process. By way of non-limiting example, process 500 may form at least part of an active acoustic echo cancellation process as performed by any device or system as discussed herein such as device 150. Furthermore, process 500 will be described herein with reference to system 600 of FIG. 5.

Figure 5:
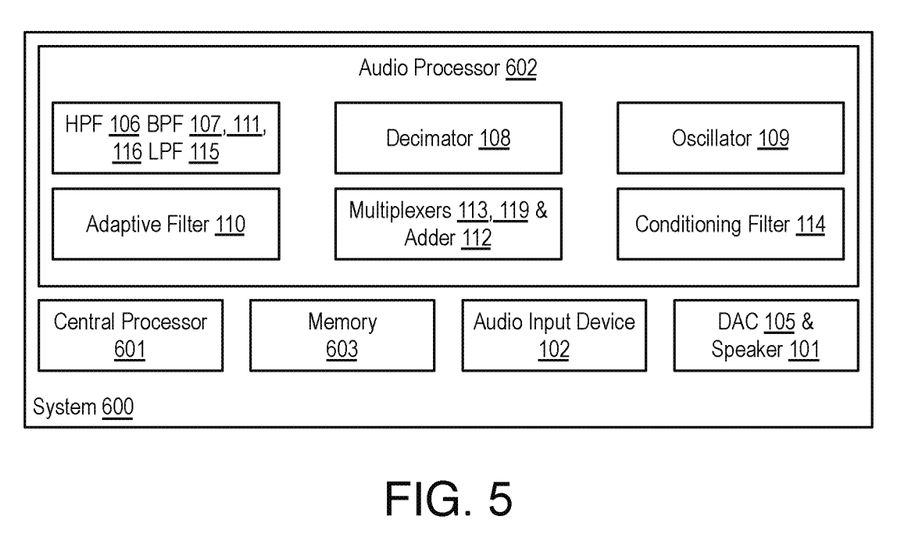
FIG. 5 is an illustrative diagram of an example system for applying active acoustic echo cancellation.

FIG. 5 is an illustrative diagram of an example system 600 for applying active acoustic echo cancellation, arranged in accordance with at least some implementations of the present disclosure. As shown in FIG. 5, system 600 may include a central processor 601, an audio processor 602, a memory 603, audio input device 102, and DAC 105/speaker 101. Also as shown, audio processor 602 may include or implement HPF 106, BPFs 107, 111, 116, and LPF 115, decimator 108, oscillator 109, adaptive filter 110, multiplexers 113, 119 and adder 112, and conditioning filter 114. In an embodiment, memory 603 stores reconstructed audio input signals, decimated audio input signals, recognized speech, playback audio, output audio signals, low, high, or band pass audio signals, and/or any other data as discussed herein.

As shown, in some embodiments, audio processor 602 may include or implement HPF 106, BPFs 107, 111, 116, and LPF 115, decimator 108, oscillator 109, adaptive filter 110, multiplexers 113, 119 and adder 112, and conditioning filter 114 are implemented via audio processor 602. In other embodiments, one or more or portions of audio processor 602 may include or implement HPF 106, BPFs 107, 111, 116, and LPF 115, decimator 108, oscillator 109, adaptive filter 110, multiplexers 113, 119 and adder 112, and conditioning filter 114 are implemented via central processor 601 or another processing unit.

Audio processor 602 may include any number and type of processing units that may provide the operations as discussed herein. Such operations may be implemented via software or hardware or a combination thereof. For example, audio processor 602 may include circuitry dedicated to manipulate audio signals. Central processor 601 may include any number and type of processing units or modules that may provide control and other high level functions for system 600 and/or provide any operations as discussed herein. Memory 603 may be any type of memory such as volatile memory (e.g., Static Random Access Memory (SRAM), Dynamic Random Access Memory (DRAM), etc.) or non-volatile memory (e.g., flash memory, etc.), and so forth.

In a non-limiting example, memory 603 may be implemented by cache memory.

In an embodiment, one or more or portions of audio processor 602 may include or implement HPF 106, BPFs 107, 111, 116, and LPF 115, decimator 108, oscillator 109, adaptive filter 110, multiplexers 113, 119 and adder 112, and conditioning filter 114 are implemented via an execution unit (EU) or EUs. The EU may include, for example, programmable logic or circuitry such as a logic core or cores that may provide a wide array of programmable logic functions. In an embodiment, one or more or portions of audio processor 602 may include or implement HPF 106, BPFs 107, 111, 116, and LPF 115, decimator 108, oscillator 109, adaptive filter 110, multiplexers 113, 119 and adder 112, and conditioning filter 114 are implemented via dedicated hardware such as fixed function circuitry or the like. Fixed function circuitry may include dedicated logic or circuitry and may provide a set of fixed function entry points that may map to the dedicated logic for a fixed purpose or function.

Returning to discussion of FIG. 4, process 500 may begin at operation 501, where an audio output signal is generated having at least a portion thereof corresponding to a first audio frequency range such that the portion of the audio output signal is to negate a response of the audio input device, at a response negation rate, to an output from a speaker in a second audio frequency range such that each audio frequency of the first audio frequency range exceeds a maximum audio frequency of the second audio frequency range. That is, the first audio frequency range is a high audio frequency range and the second audio frequency range is a low audio frequency range such that such that by wrapping the spectrogram at Fs/2, the band of interest (e.g., the low audio frequency range) will cancel out as discussed herein. In an embodiment, the audio output signal includes alternating high and low absolute amplitude values corresponding to the response negation rate that negates every second response at the audio input device.

The first and second audio frequency ranges may include any suitable frequency ranges. In an embodiment, the second audio frequency range has a bandwidth that is twice a bandwidth of the first audio frequency range. In an embodiment, a maximum frequency of the second audio frequency range and a minimum frequency of the first audio frequency range is zero such that there is no overlap between the first and second audio frequency ranges. In an embodiment, a minimum frequency of the first audio frequency range is not less than 16 kHz and the maximum audio frequency of the second audio frequency range is not more than 8 kHz. In an embodiment, a maximum audio frequency of the first audio frequency range is not more than 24 kHz and a minimum audio frequency of the second audio frequency range is not more than 50 Hz.

In an embodiment, process 500 is performed by device 150 or system 600 or the like. In an embodiment, a device or apparatus includes a speaker to generate audio output, an audio input device to receive audio input and to provide an audio input signal responsive to the audio input at a first sampling rate, and an audio controller coupled to the speaker and the audio input device, such that the audio controller is to perform one or more of operations 501-504. In an embodiment, the audio controller is implemented by an audio processor such as audio processor 602. In an embodiment, the audio controller is implemented by a central processor such as central processor 601.

The audio output signal may be generated using any suitable technique or techniques. In an embodiment, a conditioning filter filters the second audio frequency range of a playback audio signal using a filter tuned based at least in part on a speaker, an audio input device, and acoustic path to generate a second audio signal and an oscillator operates on the second audio signal to generate the portion of the audio output signal corresponding to the first audio frequency range. For example, the second audio frequency range and the third audio frequency range may be zero or 50 Hz to 8 kHz. In an embodiment, an adaptive filter generates a filter response for use by the conditioning filter such that the filter response minimizes a difference between a third audio signal having the first frequency range of the audio input signal and a fourth audio signal having the second frequency range of the audio input signal.

Processing may continue at operation 502, where an audio input responsive to the audio output signal generated at operation 501 is received and an audio input signal responsive to the audio input is provided at a first sampling rate. For example, audio output may be generated based on the audio output signal (e.g., by DAC 105/speaker 101) and audio input may be received by audio input device 102, which generates the audio input signal at the first sampling rate. In an embodiment, the audio input device comprises a microphone and a pulse density modulator. In an embodiment, the first sampling rate is 48 kHz.

Processing may continue at operation 503, where the audio input signal provided at operation 502 is decimated based on the response negation rate discussed with respect to operation 501 to a second sampling rate less than the first sampling rate (e.g., decimated by two) to generate a resultant audio input signal. For example, the decimation may include taking every other sample of the audio input signal (e.g., a by two decimation) to generate the resultant audio input signal. For example, if the first sampling rate is 48 kHz, the second sampling rate may be 24 kHz.

Processing may continue at operation 504, where the resultant audio input signal may be used in automatic speech recognition processing. Such automatic speech recognition processing may be performed using any suitable technique or techniques. As discussed herein, the resultant audio input signal includes audio data representative of only, for example, utterance 122 (and any background or residual noise) while audio output from the speaker is negated or cancelled out.

Process 500 may be repeated any number of times either in series or in parallel for any number iterations having audio input. As discussed, process 500 may provide for active acoustic echo cancellation such that the resultant decimated signal includes only an utterance (and any background or residual noise) while audio output from the speaker is negated or cancelled out.

Various components of the systems described herein may be implemented in software, firmware, and/or hardware and/or any combination thereof. For example, various components of the systems or devices discussed herein may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the operations discussed herein and/or any portions the devices, systems, or any module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 6:
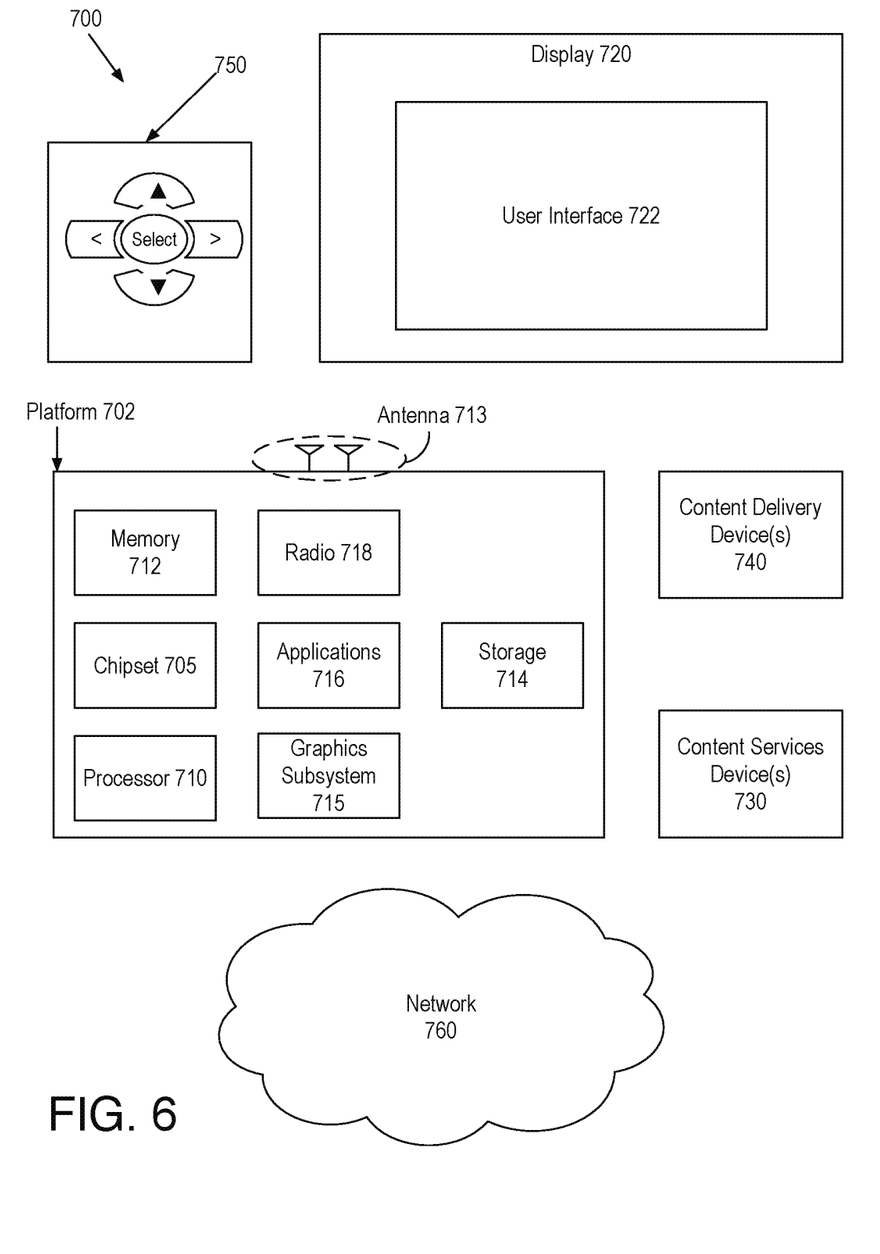
FIG. 6 is an illustrative diagram of an example system.

FIG. 6 is an illustrative diagram of an example system 700, arranged in accordance with at least some implementations of the present disclosure. In various implementations, system 700 may be a mobile system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 700 includes a platform 702 coupled to a display 720. Platform 702 may receive content from a content device such as content services device(s) 730 or content delivery device(s) 740 or other similar content sources. A navigation controller 750 including one or more navigation features may be used to interact with, for example, platform 702 and/or display 720. Each of these components is described in greater detail below.

In various implementations, platform 702 may include any combination of a chipset 705, processor 710, memory 712, antenna 713, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 710 may be dual-core processor(s), dual-core mobile processor(s), and so forth.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 714 may include technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 may be integrated into processor 710 or chipset 705. In some implementations, graphics subsystem 715 may be a stand-alone device communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 718 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In various implementations, display 720 may include any television type monitor or display. Display 720 may include, for example, a computer display screen, touch screen display, video monitor, television-like device, and/or a television. Display 720 may be digital and/or analog. In various implementations, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In various implementations, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In various implementations, content services device(s) 730 may include a cable television box, personal computer, network, telephone, Internet enabled devices or appliance capable of delivering digital information and/or content, and any other similar device capable of uni-directionally or bi-directionally communicating content between content providers and platform 702 and/display 720, via network 760 or directly. It will be appreciated that the content may be communicated uni-directionally and/or bi-directionally to and from any one of the components in system 700 and a content provider via network 760. Examples of content may include any media information including, for example, video, music, medical and gaming information, and so forth.

Content services device(s) 730 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 702 may receive control signals from navigation controller 750 having one or more navigation features. The navigation features of may be used to interact with user interface 722, for example. In various embodiments, navigation may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of may be replicated on a display (e.g., display 720) by movements of a pointer, cursor, focus ring, or other visual indicators displayed on the display. For example, under the control of software applications 716, the navigation features located on navigation may be mapped to virtual navigation features displayed on user interface 722, for example. In various embodiments, may not be a separate component but may be integrated into platform 702 and/or display 720. The present disclosure, however, is not limited to the elements or in the context shown or described herein.

In various implementations, drivers (not shown) may include technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 even when the platform is turned "off" In addition, chipset 705 may include hardware and/or software support for 5.1 surround sound audio and/or high definition 7.1 surround sound audio, for example. Drivers may include a graphics driver for integrated graphics platforms. In various embodiments, the graphics driver may include a peripheral component interconnect (PCI) Express graphics card.

In various implementations, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the present disclosure.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 6.

Figure 7:
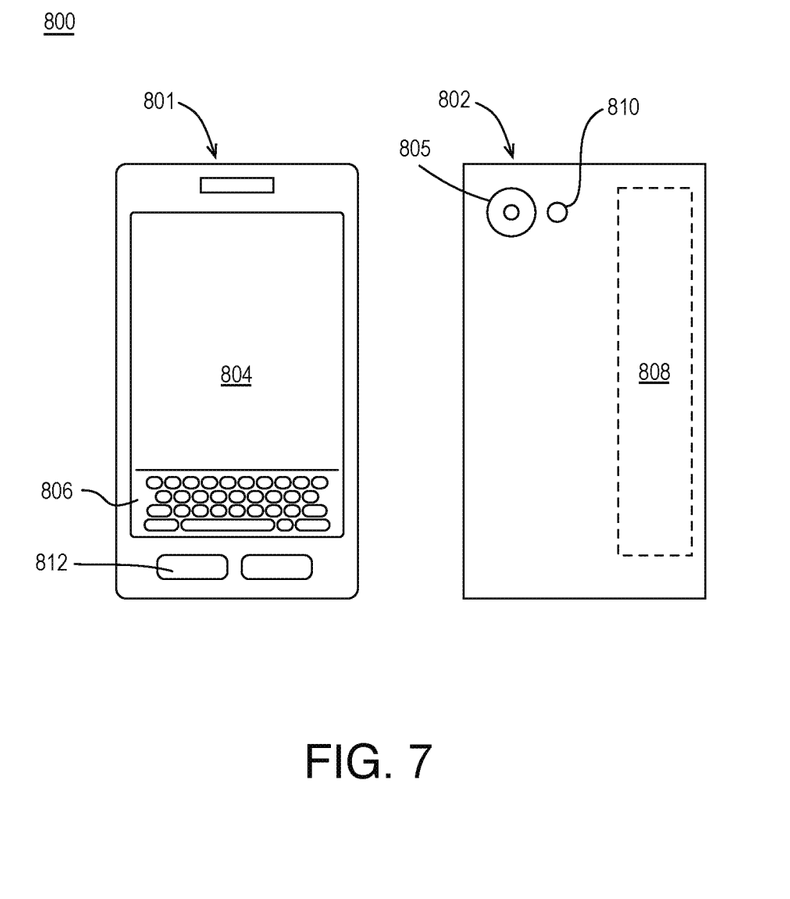
FIG. 7 illustrates an example device, all arranged in accordance with at least some implementations of the present disclosure.

As described above, system 700 may be embodied in varying physical styles or form factors. FIG. 7 illustrates an example small form factor device 800, arranged in accordance with at least some implementations of the present disclosure. In some examples, system 700 may be implemented via device 800. In other examples, device 81 or system 84 or portions thereof may be implemented via device 800. In various embodiments, for example, device 800 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, gaming console, stand alone smart speaker cameras, and so forth.

Examples of a mobile computing device also may include computers that are arranged to be worn by a person, such as wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 7, device 800 may include a housing with a front 801 and a back 802. Device 800 includes a display 804, an input/output (I/O) device 806, and an integrated antenna 808. Device 800 also may include navigation features 812. I/O device 806 may include any suitable I/O device for entering information into a mobile computing device. Examples for I/O device 806 may include an alphanumeric keyboard, a numeric keypad, a touch pad, input keys, buttons, switches, microphones, speakers, voice recognition device and software, and so forth. Information also may be entered into device 800 by way of microphone (not shown), or may be digitized by a voice recognition device. As shown, device 800 may include a camera 805 (e.g., including a lens, an aperture, and an imaging sensor) and a flash 810 integrated into back 802 (or elsewhere) of device 800. In other examples, camera 805 and flash 810 may be integrated into front 801 of device 800 or both front and back cameras may be provided. Camera 805 and flash 810 may be components of a camera module to originate image data processed into streaming video that is output to display 804 and/or communicated remotely from device 800 via antenna 808 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. An apparatus comprising:
a speaker;
an audio input device to receive audio input and to provide an audio input signal responsive to the audio input at a first sampling rate; and
one or more processors to:
generate an audio output signal comprising a portion thereof corresponding to a high audio frequency range, the portion of the audio output signal, when provided as first audio output from the speaker, to negate a response of the audio input device, at a response negation rate, to second audio output from the speaker in a low audio frequency range; and
decimate the audio input signal based on the response negation rate to a second sampling rate less than the first sampling rate to generate a resultant audio input signal.

2. The apparatus of claim 1, the one or more processors to implement:
a conditioning filter to filter a playback audio signal, the playback audio signal comprising a third audio frequency range, using a filter tuned at least in part on an inverse response of the speaker, the audio input device, and an acoustic path to generate a second audio signal; and
an oscillator to operate on the second audio signal to generate the portion of the audio output signal.

3. The apparatus of claim 2, wherein the low audio frequency range comprises the third audio frequency range.

4. The apparatus of claim 2, the one or more processors further to implement:
an adaptive filter to generate a filter response for use by the conditioning filter, wherein the filter response minimizes a difference between a third audio signal comprising the high audio frequency range of the audio input signal and a fourth audio signal comprising the low audio frequency range of the audio input signal.

5. The apparatus of claim 1, wherein the audio output signal comprises alternating high and low absolute amplitude values corresponding to the response negation rate, which negate every second response at the audio input device.

6. The apparatus of claim 1, wherein the audio output signal comprises a playback signal and the resultant audio input signal comprises a detected speech signal for automatic speech recognition.

7. The apparatus of claim 1, wherein audio frequencies of the high audio frequency range exceed audio frequencies of the low audio frequency range.

8. The apparatus of claim 1, wherein a minimum frequency of the high audio frequency range is not less than 16 kHz, a maximum audio frequency of the high audio frequency range is not more than 24 kHz, a maximum audio frequency of the low audio frequency range is not more than 8 kHz, and a minimum audio frequency of the low audio frequency range is not more than 50 Hz.

9. The apparatus of claim 1, wherein the audio input device comprises a microphone and a pulse density modulator.

10. A method comprising:
receiving an audio input and providing an audio input signal responsive to the audio input at a first sampling rate via an audio input device;
generating an audio output signal comprising a portion thereof corresponding to a high audio frequency range, the portion of the audio output signal, when provided as first audio output from a speaker, to negate a response of the audio input device, at a response negation rate, to second audio output from the speaker in a low audio frequency range; and
decimating the audio input signal based on the response negation rate to a second sampling rate less than the first sampling rate to generate a resultant audio input signal.

11. The method of claim 10, further comprising:
filtering a playback audio signal, the playback audio signal comprising a third audio frequency range, using a filter tuned at least in part on an inverse response of the speaker, the audio input device, and acoustic path to generate a second audio signal; and
generating the portion of the audio output signal by coding the second audio signal as a mirrored spectrum signal.

12. The method of claim 11, further comprising:
generating a filter response for filtering the playback audio signal, wherein the filter response minimizes a difference between a third audio signal comprising high first audio frequency range of the audio input signal and a fourth audio signal comprising the low audio frequency range of the audio input signal.

13. The method of claim 10, wherein the audio output signal comprises alternating high and low absolute amplitude values corresponding to the response negation rate, which negate every second response at the audio input device.

14. The method of claim 10, wherein audio frequencies of the high audio frequency range exceed audio frequencies of the low audio frequency range.

15. At least one machine readable medium comprising a plurality of instructions that, in response to being executed on a device, cause the device to:
receive an audio input and providing an audio input signal responsive to the audio input at a first sampling rate via an audio input device;
generate an audio output signal comprising a portion thereof corresponding to a high audio frequency range, the portion of the audio output signal, when provided as first audio output from a speaker, to negate a response of the audio input device, at a response negation rate, to second audio output from the speaker in a low audio frequency range; and
decimate the audio input signal based on the response negation rate to a second sampling rate less than the first sampling rate to generate a resultant audio input signal.

16. The machine readable medium of claim 15, wherein the machine readable medium comprises further instructions that, in response to being executed on the device, cause the device to:
filter a playback audio signal, the playback audio signal comprising a third audio frequency range, using a filter tuned at least in part on an inverse response of the speaker, the audio input device, and acoustic path to generate a second audio signal; and generate the portion of the audio output signal by coding the second audio signal as a mirrored spectrum signal.

17. The machine readable medium of claim 16, wherein the machine readable medium comprises further instructions that, in response to being executed on the device, cause the device to:

generate a filter response for filtering the playback audio signal, wherein the filter response minimizes a difference between a third audio signal comprising high first audio frequency range of the audio input signal and a fourth audio signal comprising the low audio frequency range of the audio input signal.

18. The machine readable medium of claim 15, wherein the audio output signal comprises alternating high and low absolute amplitude values corresponding to the response negation rate, which negate every second response at the audio input device.

19. The machine readable medium of claim 15, wherein audio frequencies of the high audio frequency range exceed audio frequencies of the low audio frequency range.

20. The machine readable medium of claim 15, wherein a minimum frequency of the high audio frequency range is not less than 16 kHz, a maximum audio frequency of the high audio frequency range is not more than 24 kHz, a maximum audio frequency of the low audio frequency range is not more than 8 kHz, and a minimum audio frequency of the low audio frequency range is not more than 50 Hz.

* * * * *